United States Patent [19]

Yachabach et al.

[11] 4,004,106
[45] Jan. 18, 1977

[54] LINE CIRCUIT FOR USE WITH A KEY TELEPHONE SYSTEM

[75] Inventors: Gerald J. Yachabach, Lakeland; Regis B. Mellon, St. Petersburg, both of Fla.

[73] Assignee: Akzona Incorporated, Asheville, N.C.

[22] Filed: June 25, 1975

[21] Appl. No.: 590,004

[52] U.S. Cl. .............................. 179/99; 179/84 L
[51] Int. Cl.[2] .......................................... H04M 1/00
[58] Field of Search ............. 179/1 MN, 7.1 R, 99, 179/84 L

[56] References Cited

UNITED STATES PATENTS

| | | | |
|---|---|---|---|
| 3,629,514 | 12/1971 | Flamini, Jr. | 179/99 |
| 3,742,151 | 6/1973 | Ruether | 179/99 |
| 3,806,665 | 4/1974 | Goldberg | 179/99 |
| 3,909,554 | 9/1975 | Reed | 179/99 |
| 3,914,559 | 10/1975 | Knollman | 179/99 |

*Primary Examiner*—Kathleen H. Claffy
*Assistant Examiner*—Randall P. Myers
*Attorney, Agent, or Firm*—Francis W. Young; David M. Carter

[57] ABSTRACT

There is provided a line circuit for connection to a key telephone system for indicating an incoming call, a call placed on hold, and an answered call. There is further provided a means for automatically indicating that the incoming call has been placed on hold for a predetermined time period. There is further provided a solid state device which switches telephone instrument lamp current for visual indication of the various line circuit operations.

18 Claims, 1 Drawing Figure

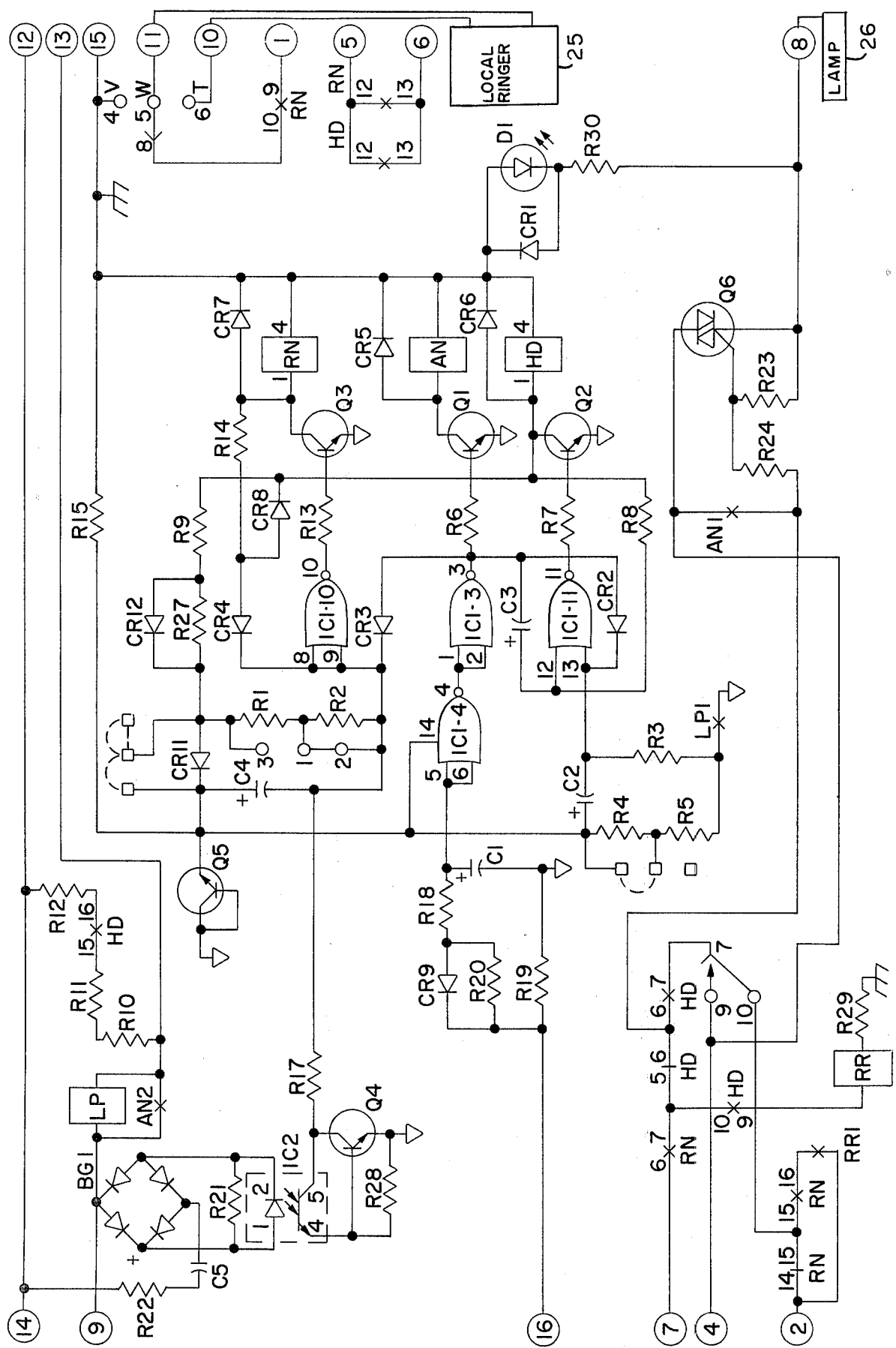

LINE CIRCUIT FOR USE WITH A KEY TELEPHONE SYSTEM

BACKGROUND OF THE INVENTION

This invention relates to telephone line circuits. More particularly it relates to telephone line circuits for providing a holding function and means for indicating that the holding function has been engaged for a predetermined time.

Telephone line circuits have been provided for switching lamp current at different flash rates to indicate an incoming call, an answered call, or a call that has been placed on hold. These circuits further provide a means for initiating a local ringer as well as providing a holding impedance which simulates the impedance of the telephone receiver when a call has been placed on hold. Most of these switching functions in the past have been performed by coil and contact relays. The contacts in this type of relay have a tendency to malfunction when relatively high currents are switched and when a large number of switching functions have been performed. The relay which have been most troublesome have been the relay supplying lamp current since the contacts must carry relatively high current to light the station instrument lamps.

One of the functional problems in the use of a key telephone system is the annoyance to an incoming caller who has been placed on hold for a substantial length of time. The attendant quite often forgets that the incoming call has been placed on hold. Therefore, it is desirable that the attendant be periodically reminded that a call has been left on hold. This would enable the attendant to tell the party left on hold the status of his call.

OBJECTS OF THE INVENTION

One of the objects of this invention is to provide a telephone line circuit capable of placing an incoming call on hold and providing an indication to the attendant that such call has been placed on hold for a predetermined time.

Another object is to provide attendant recall for a call placed on hold utilizing analogue circuitry for timing the recall.

Another object is to provide attendant recall of a call placed on hold by re-ringing the local ringer at a predetermined time ater the call has been placed on hold.

Still another object is to provide indication of attendant recall of a call placed on hold by applying current to the station lamps at a different interruption rate than the current normally supplied to the station lamps for a call on hold.

A further object is to provide a solid state switching device for switching lamp current in a line circuit.

SUMMARY OF THE INVENTION

In accordance with one form of this invention, there is provided a line circuit for use with a key telephone system. The line circuit includes tip and ring input terminals and a hold impedance adapted to be connected across the tip and ring input terminals for placing an incoming call on hold. An attendant recall circuit connected to the tip and ring input terminal includes an analogue timing circuit and a switch means. The analogue circuit provides timing for initiating a audible indicating means after the call has been on hold for a predetermined time period. There is further provided a solid state switch connected to a visual indicating device for providing a unique visual indication of attendant recall and to indicate which line in the key telephone system has been recalled.

BRIEF DESCRIPTION OF THE DRAWING

While the specification concludes with claims which particularly point out and distinctly claim the subject matter which is regarded as the invention, it is believed the invention will be better understood with the following description taken in conjunction with the accompanying drawing in which:

The FIGURE is a schematic circuit diagram incorporating one form of the present invention.

DESCRIPTION OF THE PREFERRED EMBODIMENT

Referring now more particularly to the FIGURE, there is provided a telephone line circuit having tip input terminal 14 connected to a telephone central office (not shown) through a conductor known as a tip conductor and a ring input terminal 9 connected to a telephone central office through a conductor known as the ring conductor. Ring terminal 9 is connected to full wave rectifier BG1 having four diodes connected in a bridge arrangement so as to convert an AC ring signal to pulsed DC. The full wave rectifier BG1 is further connected to tip terminal 14 through the series circuit including resistor R22 and capacitor C5. Capacitor C5 provides DC isolation to the ring detector circuit, included in IC2, while resistor R22 limits current from the line. Resistor R21 is connected across the output of full wave rectifier BG1 for providing a current threshold for sensing circuit IC2. Sensing circuit IC2 includes a light emitting diode and a light responsive transistor which isolates the telephone line current from the rest of the line circuit. Transistor Q4 has its base connected to the emitter of the light responsive transistor in IC2 for multiplying the output current of the IC2 circuit. Bias resistor R28 is connected across the base-emitter path of transistor Q4. Current limiting resistor R17 is connected to the collector of transistor Q4 and also to one side of capacitor C4.

Capacitor C4 is part of the analogue circuit which provides timing for the ring function and the re-ring function of the line circuit. Transistor Q5 is connected as a voltage regulator diode with its base and collector tied together and connected to chasis ground which is −24V with respect to earth ground which is standard in the telephone industry. The emitter of transistor Q5 is connected to one side of capacitor C4. A portion of the analogue timing circuit includes resistors R1 and R2, which are connected in series with capacitor C4. Diode CR11 acts as a voltage reference clamp and is connected between capacitor C4 and resistor R1. The parallel combination of resistor R27 and diode CR12 is connected between diode CR11 and resistor R1. Resistor R27 is part of the analogue-time delay utilized during the re-ring operation. Diode CR12 provides a shunt around time-delay resistor R27 when hold relay HD, which will be discussed later, is not energized. Resistor R9 is connected to resistor R27 for providing a time constant for the discharge of capacitor C4 when the hold relay HD is energized.

ICI-10, which in this embodiment is a NOR gate, has input terminals 8 and 9 shorted together and therefore operates as an inverter. The inputs of ICI-10 are connected to one side of capacitor C4 which controls the turn on of ICI-10. The output terminal 10 inverts the input signals of ICI-10 and is connected to switching transistor Q3 through current limiting resistor R13. The collector of transistor Q3 is connected to relay coil RN which is part of the ring relay. Ring relay coil RN is magnetically coupled to normally open contacts 12 and 13, normally open contacts 6 and 7, normally open contacts 15 and 16, and normally closed contacts 14 and 15. Diode CR7 is connected across ring relay coil RN to provide for transient protection. Resistor R14 is connected to the collector of transistor Q3 and to diode CR4 which is further connected to one side of capacitor C4 to provide a discharge path for capacitor C4.

Referring now to another portion of the circuit, key input terminal 16, known as the A lead, is adapted to be connected to a telephone line key which when depressed applies ground to input terminal 16. Input terminal 16 is connected to the parallel combination of resistor R20 and diode CR9. Resistor R20 is connected in a series circuit with resistor R18. This series circuit is further connected to capacitor C1 for providing input voltage to inverter ICI-4. Resistor R19 is connected to one side of capacitor C1 and diode CR9 for quickly discharging capacitor C1 whenever the telephone is hung up, and the ground is removed from input terminal 16.

ICI-4 is a NOR gate with its inputs 5 and 6 connected together so as to be an inverter. The output of inverter ICI-4 is connected to the input terminals 1 and 2 of ICI-3 which is also a NOR gate with its inputs connected together as an inverter. The output terminal 3 of ICI-3 is connected to diode CR3, diode CR2, and current limiting resistor R6. The other side of resistor R6 is connected to the base of transistor Q1. The collector of transistor Q1 is connected to answer relay coil AN. Answer relay coil AN is magnetically coupled to contacts AN1 and AN2. Diode CR5 is connected across answer relay coil AN for providing transient protection.

Referring now to another portion of the line circuit, resistors R4 and R5 are connected to earth ground terminal 15 through resistor R15. Terminal 15 is also connected to the B+ supply,. Resistors R4 and R5 are further connected in series and to the B+ supply through loop relay contacts LP1 when the contacts are closed. Loop relay contacts LP1 are magnetically coupled to loop relay coil LP which is connected to ring input terminal 9 which is in series with the ring lead of the telephone line. Resistor R4 is connected to timing capacitor C2 and to the B+ lead. The other side of timing capacitor C2 is connected to input terminal 13 of NOR gate ICI-11. Resistor R3 is also connected to capacitor C2 to provide discharge path for the capacitor. The other input terminal of NOR gate ICI-11 is connected to differentiating capacitor C3 which differentiates the output signal from ICI-3. Output terminal 11 of ICI-11 is connected to current limiting resistor R7 which is further connected to switching transistor Q2. The collector of switching transistor Q2 is connected back to input terminal 12 of ICI-11 to provide positive feedback to ICI-11 in order to latch on ICI-11. The collector of transistor Q2 is further connected to hold relay coil HD. Hold relay coil HD is magnetically coupled to normally open hold contacts HD 12 and 13, 6 and 7, 9 and 10, 15 and 16. The hold coil is also magnetically coupled to normally closed hold contacts 5 and 6. Diode CR6 is connected across hold relay HD to provide transient protection.

The earth ground line common to the relay coils RN, AN, and HD is connected to diode D1 which is a light emissive diode (LED) used to indicate line condition for maintenance purposes. Diode CR1 is connected across LED-D1 to provide reverse bias protection for the LED. Current limiting resistor R30 is connected to LED-D1 and further to output terminal 8 and to one side of triac Q6.

Triac Q6 is used to switch the station lamp current. The station lamps (not shown) are adapted to be connected to output terminal 8. In the past, a coil and contact relay device was used to switch current to the lamps; however, since relatively high currents are required to light the lamps and a large number of switching actions were required, relay contacts deteriorated thus making the line circuit unreliable.

One current conducting electrode of triac Q6 is connected to input terminal 4 which is connected to an AC power supply (not shown). In the past, the power terminals of the lamp circuit switch (relay) was connected to the interrupter, thus a high current mechanical interrupter was required. Since triac Q6 is gated on with relatively low gating currents through the interrupter and the power terminals are not connected to the interrupter, a low current solid state interrupter may be used with the line circuit.

The gate of triac Q6 is connected to resistors R23 and R24. Resistor R23 is further connected to the cathode of triac Q6 to insure turn off of triac Q6 at zero voltage crossover. Resistor R24 is connected to the interrupter (not shown) which is an AC voltage source on at a 50% duty cycle through normally closed hold contacts HD5 and 6 and normally open ring contacts RN6 and 7 on ring in. This resistor is further connected to the first mentioned AC source at input terminal 4 through normally open hold contacts HD 6 and 7 when the circuit is in the hold state. Resistor R24 provides current limiting to the gate of triac Q6. Resistor R24 is further connected to input terminal 2 which provides AC voltage which is 90% time on and 10% time off when the circuit is in the hold state.

Re-ring relay coil RR is connected to ground through resistor R29 and to input terminal 7 through HD relay contacts 9 and 10 and RN relay contacts 6 and 7. Re-ring relay coil RR is magnetically coupled to re-ring relay contacts RR1. Re-ring relay contacts RR1 are connected to the gate of triac Q6 through ring contacts 15 and 16 and hold contacts 9 and 10. Re-ring relay coil and contacts act as an AND gate in that current must be flowing through coil RR at the same time that there is voltage across normally open contacts RR1 in order to gate on triac Q6 in the re-ring mode.

Referring to another portion of the circuit, terminals 5 and 6 are connected to the interrupter (not shown) and across RN relay contacts 12 and 13, and HD relay contacts 12 and 13. Terminals 1 and 11 are connected to a ringer 25 for local ringing and further to ring contacts 9 and 10.

The following is a description of the operation of the circuit:

When the telephone is on hook and there is no incoming AC ringing signal on the tip and ring terminals, all of the relays are de-energized. When a ringing signal is received across the tip conductor 14 and ring conductor 9, the signal is rectified by full wave rectifier BG1 and current flows through the LED in IC2. Light is impinged upon the base of the light responsive transistor in IC2. Capacitor C4 charges through resistor R 17 to a level sufficient to overcome the threshold voltage of NOR gate ICI-10, thus placing a logic zero at its input terminals 8 and 9. NOR gate ICI-10 inverts the logic zero input to an output logic one at its output terminal 10 thus supplying a positive bias to transistor Q3. Transistor Q3 conducts current and current flows through the ring relay coil RN. RN contacts 12 and 13 are closed, thus starting the interrupter motor (not shown). Furthermore, RN contacts 9 and 10 are closed which cause local ringing of the telephone. The interrupter supplies various interrupted AC signals to input terminals 7 and 2. The energization of relay coil RN furthermore closes contacts 6 and 7. Current flows from terminal 7 through normally closed contacts HD 5 and 6 to gate on triac Q6. When triac Q6 is gated on, current flows through its anode and cathode electrodes from input terminal 4 to lamp output terminal 8. The signal supplied at input terminal 7 is 50% on and 50% off, thus the gating of the triac and the energization of the lamp will be 50% on and 50% off.

If the phone is not answered and the ring-in cycle ceases, capacitor C4 discharges through resistor R2 and R1, diode CR12, resistor R9, through hold relay coil HD and terminal 15. This removes a logic level zero from the inputs 8 and 9 of ICI-10, thus turning off transistor Q3 and de-energizing relay coil RN. This opens the ring relay contacts and local ringing as well as lamp indication ceases.

When an incoming call is answered, the telephone key which is connected to input terminal 16 is shorted to ground. Inputs 5 and 6 of ICI-4 detect a logic level one which is inverted to logic level zero at output terminal 4, and then reinverted by ICI-3 at its output terminal 3 to a logic level one. The logic level one forward biases transistor Q1, thus allowing current to flow through answer relay coil AN. This causes relay contacts AN2 to shunt loop relay coil LP thus providing zero impedance electrical signal connection to the telephone hand set (not shown). Energization of relay coil AN also closes relay contacts AN1. This provides continuous gating of traic Q6 from AC input terminal 4. Triac Q6 gates on thus providing uninterrupted lamp current to lamp output terminal 8.

When a call is to be placed on hold, a hold key is depressed which removes the ground from input terminal 16. Input terminals 5 and 6 of ICI-4 return to a logic zero thereby returning output terminal 3 of ICI-3 to zero which turns off transistor Q1, thus de-energizing answer relay coil AN. Answer relay contacts AN2 are thus opened and the current flows through loop relay coil LP. With loop relay coil LP energized, relay contacts LP1 are closed, thus causing capacitor C2 to charge through resistor R3. This charging of capacitor C2 provides a logic zero level on input terminal 13 and NOR gate ICI-11. A logic zero level is provided at the inputs 5 and 6 of ICI-4 and as previously described, resulted in a logic zero level at ICI-3. As a result, ICI-3 makes a transistor from a logic one level to a logic zero level when a party is placed on hold. This negative transition is differentiated by capacitor C3, thereby providing a temporary logic level zero at input terminal 12 of ICI-11. Since ICI-11 is a NOR gate, the presence of two logic level zeros at its input provide a logic level one at its output terminal 11. This forward biases transistor Q2 and current flows through hold relay coil HD through the collector-emitter path of transistor Q2. With transistor Q2 saturated, its collector is essentially grounded, thus applying a positive feedback of a logic level zero through resistor R8 to input terminal 12 of ICI-11, thereby latching on ICI-11. Energizing hold relay coil HD closes contacts HD 15 and 16, thereby providing a current path from the ring input terminal 9 through coil LP, through the hold impedance resistors R10, R11, R12 back to tip input terminal 14. Thus, the incoming call has been placed on hold.

With the energization of hold coil HD, hold relay contacts 12 and 13 are closed, thus applying energy to start the interrupter motor. The interrupter motor supplies a signal to input terminal 2 which is 90% on and 10% off. Current flows from input terminal 2 through normally closed RN contacts 14 and 15 through the closed hold contacts 6 and 7 to gate on triac Q6. Triac Q6 then conducts current to lamp terminal 8 at a flash rate of 90% on and 10% off during the hold cycle.

When a call which was previously on hold is answered, the key button connected to input terminal 16 is depressed and ground is again applied to input terminal 16. Therefore, logic one exists at terminals 5 and 6 of ICI-4. This causes the answer relay to be energized, as previously described, thereby shunting loop relay coil LP by closing contacts AN2. The shunting of loop relay coil LP opens contacts LP1; therefore, capacitor C2 discharges through CR2 to the logic one level at NOR gate ICI-3. This applies a logic level one to input terminal 13 of ICI-11 thereby causing a logic level zero at output 11. Transistor Q2 is turned off thus de-energizing hold relay coil HD. As hold relay coil HD de-energizes, hold relay contacts 15 and 16 open and the holding impedance R10, R11, and R12 are removed from across the tip and ring input terminals 14 and 9. With answer coil energized, again answer contacts AN1 are closed thus providing steady lamp current through triac Q6.

When a party has been placed on hold for a predetermined time, for example, one minute, the audible indicator 25 will be re-rung and the lamp 26 will provide a unique indication that re-ring is occurring for that particular line. This predetermined timing cycle begins when a line is placed on hold. While the line is on hold, the collector transistor Q2 is approximately at ground potential. Timing capacitor C4 is charged through resistors R9, R27, R1, and R2. When the charge on capacitor C4 reaches the threshold level of ICI-10 at its inputs 8 and 9, a logic level zero is applied to the inputs of ICI-10. This level zero is inverted and a logic level one is applied at the output 10 of ICI-10. Transistor Q3 then conducts thus energizing ring relay RN closing ring contacts RN 9 and 10 causing an audible indication that the system is re-ringing.

In order to supply a unique lamp indication of re-ring, re-ring relay RR is utilized. When ring relay RN is energized, ring contacts 6 and 7 are closed; and since hold contacts 9 and 10 are already closed due to the fact that transistor Q2 is on, current flows from input terminal 7 at a rate of 50% on and 50% off through re-ring relay coil RR and resistor R29. Another signal from input terminal 2 is applied to re-ring contacts RR1 at a rate of 90% on and 10% off. Current passes through these contacts when the contacts are closed to the gate of triac Q6 through ring contacts 15 and 16 and hold contacts 6 and 7. The combination of re-ring coil RR and re-ring contacts RR1 act as an AND gate, i.e. current is supplied to the gate of triac Q6 only when these signals are applied simultaneously to the re-ring coil RR and re-ring contacts RR1. Thus, a composite signal of 90% on and 10% off from input terminal 2, and 50% on and 50% off from input terminal 7, is applied to the gate of triac Q6. Thus, the triac Q6 and the lamp which is connected to output terminal 8 conducts in accordance with this composite signal providing a unique indication that this particular line has been on hold for longer than a predetermined time and is being re-rung.

The line circuit will continue to re-ring and provide unique lamp indication until that particular line key is depressed (at terminal 16) thus applying ground to input terminal 16 again causing logic level one to be applied to input terminals 5 and 6 of ICI-4. A logic level zero is applied to the output terminal 3 of ICI-3, thus forward biasing diode CR3 which in turn causes capacitor C4 to quickly discharge. A logic level one is provided at the input terminals of ICI-10, thus providing a logic level zero at its output terminal. This turns off transistor Q3 which in turn de-energizes ring relay RN. This ends the re-ring cycle.

The circuit described above has been built and operated with components having the following sets of values:

ICI - Quad 2 input NOR gate, 4001 C-MOS chip
IC2 - Motorola 4N28 optical coupler
Transistors Q1, Q2, Q3, Q4, Q5 — 2N2222
Triac Q6 — GE SC141D
Capacitors C1, C2, C3 — 1 uF
Capacitor C4 — 10 uF
Capacitor C5 — 0.33 uF
Diode Bridge BG1 — GI W40M
Diode CR1, CR5, CR6, CR7, CR10, — IN4004
Diode CR2, CR3, CR4, CR11, CR12 — IN4148
Relay RN — 4PDT cradle, 24 volt 720 ohm coil
AN — 2 form A reed, 24 volt 1750 ohm coil
HD — 4 PDT cradle, 24 volt 720 ohm coil
LP — 1 form A reed, 16 ma 39.6 ohm coil
RR — 1 form A reed, 16 ma 39.6 ohm coil
Resistors R10, R11, R12, R24 — 39 ohms
Resistors R6, R7, R13, R17, R18, R23 — 10 k ohms
Resistors R29, R30 — 330 ohms
Resistors R15, R19 — 2.2 k ohms
Resistor R4 — 680 ohms
Resistor R27 — 3 megohms
Resistors R1, R2, R9 — 1 megohom
Resistors R3, R5 — 47 k ohm
Resistor R14 — 220 k ohm From the foregoing description of the preferred embodiment of the invention, it will be apparent that many modification may be made therein. It will be understood, therefore, that this embodiment is intended as an exemplification only and that the invention is not limited thereto. It is to be understood that it is intended in the appended claims to cover all such modifications as fall within the true spirit and scope of the invention.

What is claimed is:

1. A line circuit for use with a key telephone system comprising:
   first and second input terminals adapted to be respectively connected to tip and ring conductors;
   a hold circuit including a hold impedance adapted to be connected across first and second input terminals during the hold condition, said hold circuit including a first switch means for activating said hold circuit;
   a first output terminal adapted to be connected to a indicating means; the indicating means adapted to provide a first signal during said hold condition; timing means including an analogue circuit for initiating the indicating means at a predetermined time after said hold circuit has been activated; the indicating means providing a second signal after said predetermined time.

2. A line circuit as set forth in claim 1 further including a second switch means having a control electrode and first and second power electrodes; a power input terminal connected to said first electrode of said second switch means; the indicating means connected to said second electrode of said second switch means; means for applying a first gating signal to said control electrode of said second switch means substantially at said predetermined time after said hold circuit has been activated for initiating the indicating means.

3. A circuit as set forth in claim 2 wherein said second switch means is a solid state device.

4. A line circuit as set forth in claim 2 further including means for applying a second gating signal to said control electrode upon the occurrence of a ring signal on the ring conductor; means for applying a third gating signal to said control electrode upon said hold circuit being activated; said first gating signal being different than said second and third gating signals, whereby said second indicating means provides a unique indication of said hold circuit being activated for a predetermined time.

5. A circuit as set forth in claim 4 wherein the indicating means is a visual device.

6. A circuit as set forth in claim 4 wherein the indicating means is the lamp associated with a telephone key.

7. A line circuit for use with a key telephone system comprising:
   first and second input terminals adapted be connected to associated tip and ring conductors; a hold impedance; hold switch means connected to said hold impedance for connecting said hold impedance across said first and second input terminals during the hold condition;
   a solid state switch having first and second power electrodes and a control electrode; said first power electrode adapted to be connected to a visual indicator; said second power electrode adapted to be connected to a source of electrical energy; first switch means connected to said control electrode for connecting said control electrode to a first signal source having a characteristic for indicating a ringing signal on the visual indicator; second switch means connected to said control electrode for connecting said control electrode to a second signal source for indicating an answered call on the visual indicator; a third switch means connected to said control electrode for connecting said control electrode to a third signal source for indicating a call on hold on the visual indicator; a fourth switch means connected to said control electrode and to at least one of the first and third signal sources for providing a visual indication of attendant recall at a predetermined time after a call being placed on hold, said visual recall indication being substantially different from the visual indication of ring, answered call, and hold condition.

8. A line circuit as set forth in claim 7 further including a means for controlling said fourth switch means, said means for controlling including a timing circuit.

9. A line circuit as set forth in claim 8 wherein said timing circuit includes a capacitor.

10. A line circuit as set forth in claim 8 further including a key input terminal; said means for controlling further includes logic circuit means connected to said first and second input terminal and being further connected to said key input terminal.

11. A line circuit as set forth in claim 10 further including first, second, and third transistors and ring, answer, and hold relay coils; said first, second, and third transistors being respectively connected to and controlling said ring, answer, and hold relay coils; said logic circuit means connected to and controlling said transistors; said ring relay coil controlling said first switch means; said answer relay coil controlling said second switch means; said hold relay coil controlling said third switch means; said first, second, and third switch means including mechanical relay contacts; said fourth switch means including a relay coil and mechanical relay contacts.

12. A line circuit as set forth in claim 7 wherein said fourth switch means is initiated upon the simultaneous occurrence of the first and third signals.

13. A line circuit as set forth in claim 12 wherein said fourth switch means includes re-ring relay coil and contacts.

14. A line circuit as set forth in claim 7 wherein said solid state switch is a triac.

15. A line circuit for use with a key telephone system comprising:
first and second input terminals for connection to first and second telephone conductors; a hold impedance; a hold switch connected to said hold impedance for connecting said hold impedance across the first and second telephone conductors; sensing means connected to said first input terminal for sensing a ringing signal; ring switch means connected to said sensing means for energizing a local ringer; timing means and means connecting said timing means to said hold switch and said ring switch for turning on said ring switch thus re-ringing the local ringer at a predetermined time after energization of said hold switch.

16. A line circuit as set forth in claim 15 further including a latching circuit for controlling said hold switch.

17. A line circuit as set forth in claim 16 wherein said latching circuit includes a logic gate having first and second input terminals and an output terminal; a transistor having first, second, and third electrodes; said logic gate output terminal being connected to said first electrode of said transistor; said first input terminal of said logic gate being connected to said second electrode of said transistor.

18. A line circuit as set forth in claim 17 further including a capacitor connected to said second input terminal of said logic gate for differentiating input pulse thereto.

* * * * *